(12) United States Patent
Zauner et al.

(10) Patent No.: US 10,696,811 B2
(45) Date of Patent: Jun. 30, 2020

(54) EXPANSION SYSTEM FOR FLEXIBLE INSULATION FOAMS

(71) Applicant: Armacell Enterprise GmbH & Co. KG, Schönefeld OT Waltersdorf (DE)

(72) Inventors: Christoph Zauner, Laer (DE); Miroslav Bettermann, Duisburg (DE)

(73) Assignee: ARMACELL ENTERPRISE GMBH & CO. KG, Schönefeld ot Waltersdorf (DE)

(*) Notice: Subject to any disclaimer, the term of this patent is extended or adjusted under 35 U.S.C. 154(b) by 140 days.

(21) Appl. No.: 15/945,450

(22) Filed: Apr. 4, 2018

(65) Prior Publication Data

US 2018/0291168 A1  Oct. 11, 2018

(30) Foreign Application Priority Data

Apr. 11, 2017  (EP) .................... 17166016

(51) Int. Cl.
| | | |
|---|---|---|
| *C08J 9/00* | (2006.01) | |
| *C08J 9/08* | (2006.01) | |
| *C08J 9/10* | (2006.01) | |
| *C08K 3/26* | (2006.01) | |
| *C08K 5/25* | (2006.01) | |
| *C08L 9/00* | (2006.01) | |
| *F16L 59/02* | (2006.01) | |
| *G10K 11/162* | (2006.01) | |

(52) U.S. Cl.
CPC .............. *C08J 9/08* (2013.01); *C08J 9/0019* (2013.01); *C08J 9/0038* (2013.01); *C08J 9/0061* (2013.01); *C08J 9/0066* (2013.01); *C08J 9/104* (2013.01); *C08J 9/105* (2013.01); *F16L 59/028* (2013.01); *G10K 11/162* (2013.01); *C08J 2201/026* (2013.01); *C08J 2201/03* (2013.01); *C08J 2203/02* (2013.01); *C08J 2203/04* (2013.01); *C08J 2203/18* (2013.01); *C08J 2205/052* (2013.01); *C08J 2205/06* (2013.01); *C08J 2207/00* (2013.01); *C08J 2300/26* (2013.01); *C08J 2309/00* (2013.01); *C08J 2309/02* (2013.01); *C08J 2309/06* (2013.01); *C08J 2311/00* (2013.01); *C08J 2323/04* (2013.01); *C08J 2323/06* (2013.01); *C08J 2323/16* (2013.01); *C08J 2323/22* (2013.01); *C08J 2323/28* (2013.01); *C08J 2327/06* (2013.01); *C08J 2400/22* (2013.01); *C08J 2423/08* (2013.01); *C08J 2423/28* (2013.01); *C08J 2431/04* (2013.01)

(58) Field of Classification Search
CPC ...... C08J 9/0019; C08J 9/0038; C08J 9/0061; C08J 9/0066; C08J 9/08; C08J 9/104; C08J 9/105; C08J 2201/02; C08J 2201/03; C08J 2201/18; C08J 2205/06; C08J 2207/00; C08J 2300/26; C08J 2309/00; C08J 2309/02; C08J 2309/06; C08J 2327/06; C08J 2400/22; C08J 2323/08; C08J 2323/28; C08K 2341/04; F16L 59/028; G10K 11/162
See application file for complete search history.

(56) References Cited

U.S. PATENT DOCUMENTS

| | | | |
|---|---|---|---|
| 2006/0142405 A1* | 6/2006 | Kijima | .................. C08J 9/0023 521/142 |
| 2008/0281007 A1* | 11/2008 | Weidinger | ............... C08J 9/125 521/84.1 |

FOREIGN PATENT DOCUMENTS

| | | |
|---|---|---|
| EP | 2 921 475 A1 | 9/2015 |
| JP | 2003-211481 A | 7/2003 |
| JP | 2007-217662 A | 8/2007 |

OTHER PUBLICATIONS

European Search Report issued for European Application No. 17166016.0 dated Oct. 13, 2017, 6 pages.

* cited by examiner

*Primary Examiner* — Melissa A Rioja
(74) *Attorney, Agent, or Firm* — Rothwell, Figg, Ernst & Manbeck, P.C.

(57) ABSTRACT

A flexible material for thermal and acoustical insulation comprising an expanded polymer (blend) based on at least one elastomer, wherein expansion is achieved by decomposition of a mixture of at least two chemical blowing agents, comprising the exothermic chemical blowing agent 4,4'-Oxybis(benzenesulfonyl hydrazide) (OBSH) and at least one endothermic blowing agent.

20 Claims, No Drawings

EXPANSION SYSTEM FOR FLEXIBLE INSULATION FOAMS

CROSS REFERENCE TO RELATED APPLICATION

This application claims the priority to European Application Number 17166 016.0 filed Apr. 11, 2017, the disclosure of which is incorporated herein in its entirety by reference.

FIELD OF THE INVENTION

The present invention relates to a flexible material for thermal and acoustical insulation comprising an expanded polymer (blend) based on at least one elastomer, wherein expansion is achieved by decomposition of a mixture of at least two chemical blowing agents, comprising the exothermic chemical blowing agent 4,4'-Oxybis(benzenesulfonyl hydrazide) (OBSH) and at least one endothermic blowing agent.

BACKGROUND OF THE INVENTION

Flexible, expanded materials comprising a polymer (blend) for thermal and acoustic insulations are well established in the market since decades. They are used for commercial and residential construction as well as for industrial applications in various industries. The reasons for choosing such materials are manifold: They are watertight and therefore prevent corrosion under insulation, have excellent thermal and acoustic insulation properties and they are easy to apply due to their flexibility, easy cuttability and bondability with one-component adhesives.

The polymeric insulation foams used for such applications comprise mainly two groups of materials, polyethylene foams (PEFs) and flexible elastomeric foams (FEFs).

Polyethylene foams (PEFs) are made by a physical expansion (foaming) process, using physical blowing agents. Flexible elastomeric foams (FEFs) are flexible insulation materials with a high filler loading, achieved by a chemical expansion (foaming) process. Such materials are almost exclusively based on a narrow selection of polymer (elastomer) bases. The majority of such expanded materials are based upon acrylonitrile butadiene rubber (NBR) or NBR/polyvinyl chloride (PVC) (e.g. NH/Armaflex®, AF/Armaflex®, K-Flex® ST, Kaiflex® KKplus), ethylene propylene diene rubber (EPDM) (e.g. HT/Armaflex®, Aerocel® AC) and polychloroprene (CR) (Armaflex® Ultima). Expanded EPDM is mainly used for higher temperature insulation, e.g. solar applications, CR is used for applications where high flame resistance and low smoke emission are requested and NBR is the most widespread polymer base for standard FEFs, such as in heating and plumbing and ventilation and cooling applications. Due to the high loadings feasible with such materials, the product properties can be modified in a wide range, e.g. concerning flame resistance, thermal conductivity, mechanical properties, water vapour resistance, etc.

Since the late 70s of the last century, the expansion of FEFs is achieved by using azodicarbonamide (ADCA) as a chemical blowing agent. ADCA is one of the most effective blowing agents and therefore widely used, not only for FEFs, but for cellular rubber and thermoplastic in general. It has the highest gas yield of all commercially available blowing agents ($\approx$220 ml/g) and decomposes mainly to nitrogen and carbon dioxide. Decomposition of pure ADCA starts above 200° C. ($\approx$220° C.), but such temperature can be significantly decreased in a wide range by using—among many others—zinc containing substances, especially ZBS (zinc benzenesulfinate dehydrate) and ZnO (zinc oxide).

In December 2012, ADCA was added by the ECHA (European Chemicals Agency) to the candidate list of substances of very high concern for authorisation due to the equivalent level of concern having probable serious effects to human health. Although there is currently no clear evidence for such effects, there is still a risk that the use of ADCA will be limited or restricted. Therefore, there is a need for substitutes of the same or comparable performance. Unfortunately, the substitution of ADCA within FEFs is particularly difficult, as the densities of such foams are very low (at least below 70 kg/m$^3$, for the majority of applications below 60 kg/m$^3$ or even below 55 kg/m$^3$). Such densities are unavoidable to achieve the required properties, e.g. low thermal conductivity, flexibility, bendability, etc.

Chemical blowing agents can in general be divided into two major groups: endothermic and exothermic materials. Exothermic blowing agents liberate a higher amount of gas compared to endothermic blowing agents and create a higher gas pressure. The decomposition temperature of such products can in many cases be adjusted (means lowered) by addition of kickers. Endothermic blowing agents are based on inorganic carbonates or hydrogen carbonates and release mainly $CO_2$ (carbon dioxide) and in many cases water, too. They can be activated by acids, e.g. citric acid, to reduce their decomposition temperatures.

The amount of commercially available exothermic blowing agents is very limited. Apart from ADCA, only five additional substances are of commercial interest:
1. OBSH (4,4'-Oxobisbenzene-solfonylhydrazide),
2. TSH (p-Toluenesulfony-hydrazide),
3. TSS (p-Toluolsulfonyl-semicarbazide),
4. 5PT (5-Phenyl-1H-tetrazole) and
5. DNPT (N,N'-Dinitrosopentamethylene-tetramine).

Concerning gas yield (190 ml/g) and decomposition temperature ($\approx$200° C.), DNPT is the most comparable one to ADCA of all aforementioned chemical blowing agents. Unfortunately, it releases nitrous gases through decomposition and would therefore not be alternative, especially in respect to human health effects.

The decomposition temperature of 5PT ($\approx$240° C.) is even higher than ADCA decomposition temperature and no kicker is known for such blowing agent. Due to this, 5PT would also not be an alternative to ADCA, as FEFs cannot be processed at such high temperatures (degradation of e.g. polymer chains, cross-links, flame retardants, etc.).

Decomposition temperature of TSS is $\approx$220° C., but kickers are available (urea, PTA and NEt3). However, TSS is suspected to be carcinogenic in bioassays and semicarbazides are in general in focus of WHO. Due to this, even TSS is not an acceptable alternative to ADCA for FEFs.

TSH has the lowest decomposition temperature of the exothermic blowing agents ($\approx$145° C.), but the decomposition temperature is further reduced to 100-130° C. when used within FEF compounds. Due to such decomposition temperature, no sufficient crosslinking can be achieved prior to expansion, resulting in significantly higher densities and instable and/or open cells. Furthermore, the gas yield of such blowing agent ($\approx$100 ml/g) is quite low compared to ADCA.

The only remaining blowing agent is OBSH. Although the decomposition temperature ($\approx$160° C.) and gas yield ($\approx$125 ml/g) are significantly lower compared to ADCA, it is feasible to produce FEFs using such blowing agents. However, significant adjustments of cure package and process conditions are necessary to achieve sufficient densities and product qualities. Nevertheless, there are several drawbacks of using OBSH: The resulting products are firmer (less flexible), elasticity and recovery behavior are worse. They are typically of higher density (US20100065173) and therefore have significantly higher thermal conductivities; or they are not closed cell foams (CN104945746 and U.S. Pat. No. 8,353,130) and therefore have worse water vapor barrier properties (WVT according to EN 13469/EN 12086:<1000).

A large number of endothermic chemical blowing agents is commercially available, although the amount of different raw materials is quite limited. The major reason for such a huge amount of commercially available products is the broad variety of mixtures, ratios, particle sizes, activation etc. of such raw materials, individually composed for the target applications. Although such blowing agents are preferred regarding health and environmental risks, the required densities cannot be reached (lowest achievable densities are above 200 kg/m$^3$).

SUMMARY OF THE INVENTION

Surprisingly the present inventors found out that a versatile, flexible material for thermal and acoustical insulation comprising at least one layer of an expanded polymer (blend) based on at least one elastomer and without the use of ADCA—not showing any of the aforementioned drawbacks—can be achieved by decomposition of a well-balanced mixture of at least two chemical blowing agents, comprising 4,4'-Oxybis(benzenesulfonyl hydrazide) (OBSH) and at least one endothermic blowing agent.

All quantities concerning the claimed material are related to the polymeric mixture, which is defined as the mixture of all raw materials prior to expansion and crosslinking, which means, that the polymeric mixture comprises all raw materials used for the manufacturing of the expanded polymer (blend). In contrast, the expanded polymer (blend) particularly does not comprise the blowing agent anymore, as it decomposes to result in expansion.

This material can be obtained by continuous extrusion, crosslinking and expansion to a final product density of ≤70 kg/m$^3$, preferably ≤60 kg/m$^3$, especially preferred ≤55 kg/m$^3$ according to DIN EN ISO 845. Densities of ≤60 kg/m$^3$ or even ≤55 kg/m$^3$ are preferred as they lead to a material having lower thermal conductivity and lower costs due to less material consumption.

Subject matter of the present invention is a polymeric mixture, comprising ≤40.0 wt %, preferably ≤33.3 wt %, but ≥10.0 wt %, preferably ≥12.5 wt % of at least one elastomer or thermoplastic/elastomer-blend, of which at least 25 wt % are at least one sulphur and/or metal oxide crosslinkable polymer and 5 to 40 wt %, preferably 10 to 30 wt % of a blowing agent mixture comprising itself 70 to 95 wt % of 4,4'-Oxybis(benzenesulfonyl hydrazide) and 5 to 30 wt % of at least one endothermic blowing agent, wherein the 4,4'-Oxybis(benzenesulfonyl hydrazide) and the at least one endothermic blowing agent sum up to 100%.

In one embodiment the crosslinkable polymer is crosslinked and the mixture is expanded to flexible material by decomposition of the aforementioned blowing agents.

All quantities within such polymeric mixture are related to a total of 100 phr of polymer content. The total amount always comprises the aforementioned 100 phr of polymer, too. The overall quantities of all ingredients sum up to at least 250 phr, preferably at least 300 phr, but less than 1000 phr, preferably less than 800 phr. Such quantities include the amount of chemical blowing agent, as the polymeric mixture describes the state of the material prior to crosslinking and expansion. In other words, the polymer content related to the overall quantity of all ingredients is ≤40.0 wt %, preferably ≤33.3 wt %, but ≥10.0 wt %, preferably ≥12.5 wt %. The given percentages are rounded to the first decimal place.

The 100 phr of the polymer content comprise at least one sulphur and/or metal oxide crosslinkable polymer and at least one elastomer or thermoplastic/elastomer-blend. At least 25 phr (equal to 25 wt %) of such polymer content need to be sulphur and/or metal oxide crosslinkable. According to this invention, polymeric plasticizers and polymeric flame retardants are not a part of the aforementioned polymer content.

Especially preferred are blends comprising at least 80 phr of acrylonitrile butadiene rubber (NBR) and/or polychloroprene (CR) and/or ethylene propylene diene rubber (EPDM) and/or butyl rubber (IIR, including chlorinated and brominated butyl rubber) and or butadiene rubber (BR) and/or styrene butydiene rubber (SBR) and/or polyvinyl chloride (PVC, including its co- and terpolymers) and/or polyethylene (PE, including its co- and terpolymers) and/or chlorinated polyethylene (CPE/CM). Choice and ratio of the aforementioned polymers are depending on the target applications.

Additionally, the polymer content of the claimed material may comprise all kind of elastomers, thermoplastics or thermoplastic elastomers, like—but not restricted to—ACM/AEM (arylic elastomers), AU/EU (polyurethanes), (G)(E)CO (epichlorohydrin elastomers, EPM (ethylene propylene rubber), EVA/EVM (ethylene vinylacetate copolymers), SBR (styrene butadiene rubber), HNBR (hydrogenated nitrile butadiene rubber), FKM/F(E)PM (fluoroelastomers), GPO (propylene oxide rubbers), IR (isoprene rubber), (V)MQ (silicone rubber), NR (natural rubber), T (polysulfide rubber), PP (polypropylene), PET (polyethylene terephthalate), PBT polybutylene terephthalate), PC (polycarbonate), PS (polystyrene), PA (polyamide), PU (polyurethane), PTFE (polytetrafluoroethylene), PMMA (polymethyl methacrylate).

The mixture of at least two chemical blowing agents comprises 4,4'-Oxybis(benzenesulfonyl hydrazide) (OBSH) and at least one endothermic blowing agent. The endothermic blowing agent is preferably a carbonate or hydrogen carbonate, especially preferred is sodium bicarbonate. The decomposition of the carbonate or hydrogen carbonate can be carried out by addition of acidic substances, preferred are calcium acid phosphate, sodium aluminum phosphate and citric acid. All blowing agents are present in the form of a powder.

The OBSH may have a median particle size of 1 to 20 µm, preferably from 1 to 12 µm, especially preferred from 2 to 8 µm. The at least one endothermic blowing agent may have a median particle size of 1 to 20 µm, preferably from 1 to 12 µm, especially preferred from 2 to 8 µm. The particle size is determined by laser diffraction particle size analysis according to ISO 13320:2009. Such particle sizes lead to the best balance between—on the one hand—processing time and temperature and—on the other hand—cell size of the foam, as the cell size of the foam has an direct impact on the thermal conductivity of the material (smaller cells means lower thermal conductivity—in other words—better insulation properties). The preferred and especially preferred particle sizes do not further improve (means decrease) the cell size of the material, but reduce the processing time due to faster decomposition.

To prevent agglomeration of the particles and improve dispersability in the polymer, the particles can be coated, e.g. using fatty acids like stearic acid or metal salts of fatty acids like calcium stearate; or they can be surface-modified, e.g. silanized. Such an improved dispersability results in decreased mixing cycles and less defects within the expanded material.

Based on the assumption that such blowing agent mixture itself adds up to 100%, it comprises 70 to 95 wt % of OBSH and 5 to 30 wt % of at least one endothermic blowing agent. Lower amounts of OBSH in relation to the endothermic blowing agent lead to higher product densities, open cell structure, worse WVT (water vapor transmission) properties and higher shrinkage. Higher amounts of OBSH again lead to an open cell structure, worse WVT properties and additionally high stiffness, which means worse flexibility and bendability, resulting in issues during installation and bonding.

The polymeric mixture furthermore comprises at least one crosslinking system such as peroxides, triallylcyanurate, triallylisocyanurate, phenylmaleimide, thiadiazoles, fatty acid amide, hydrosilylation agents, radiation activators (for radiation or UV curing), sulphur systems, bisphenolics, metal oxides. Preferred are sulphur and/or metal oxide crosslinking systems due to easy processability and best balance between mechanical properties and costs.

The polymeric mixture may further comprise at least 60 phr, preferably at least 100 phr of at least one inorganic filler (including carbon black). The inorganic filler may be an aluminium compound, such as aluminium silicates, oxides, hydroxides, e.g. ATH (aluminium hydroxide), and/or a silicon based compound, such as silicates, quartz, zeolites, or mineral based accordingly, e.g. gypsum, clay, huntite, hydromagnesite, perlite, vermiculite, chalk, slate, graphite, talc/mica, and/or any kind of carbon black or pigment, or any mixtures thereof. Preferred are inorganic fillers that cool down the fire by releasing water or dilute or inhibit the oxygen supply of the flame by the release of carbon dioxide, carbon monoxide, etc. at temperatures above 180° C. Especially preferred are aluminium hydroxide (ATH), magnesium hydroxide, huntite and hydromagnesite due to the high level of water release.

The polymeric mixture may comprise at least 15 phr, preferably at least 20 phr, especially preferred at least 25 phr—related to the polymer content—of at least one plasticizer. The kind of plasticizer depends on the polymer choosen, e.g. paraffin, chlorinated plasticizers, phosphate plasticizers (e.g. diphenyl cresyl phosphate (DPK)), adipate plasticizers, polymeric plasticizers, phthalate plasticizers. Preferred are chlorinated plasticizers, phosphate plasticizers and paraffins, whereby paraffins are mainly used for non-polar polymers like EPDM, as such polymers do not accept higher polar plasticizers.

The polymeric mixture may further comprise at least one flame retardant, e.g. organohalogen compounds (brominated and/or chlorinated), e.g. 2,3,4,5,6-Pentabromo-1-(2,3,4,5,6-pentabromophenoxy)benzene (Deca-BDE), 2,2',6,6'-Tetrabromo-4,4'-isopropylidenediphenol (TBBPA), 1,2,3,4,7,8,9,10,13,13,14,14-dodecachloro-1,4,4a,5,6,6a,7,10,10a,11,12,12a-dodecahydro-1,4,7,10-dimethanodibenzo[a,e]cyclooctene (Dechlorane plus), brominated epoxy polymers, and/or (organo)phosphorus compounds, e.g., red phosphorous, aluminium diethylphosphinate, pentaerythritol spirobis (methylphosphonate), tricresyl phosphate (TCP), and/or nitrogen compounds, e.g. melamine cyanurate, melamine salts, melamine borate, and/or combinations of aforementioned approaches within one compounds, e.g. ammonium polyphosphate (APP), melamine polyphosphate, Tris(1,3-dichloroisopropyl)phosphate.

The polymeric mixture may comprise at least one synergist for halogen containing plasticizers, polymers and flame retardants, e.g. antimony trioxide, zinc stannate, zinc hydroxystannate, 2,3-Dimethyl-2,3-diphenylbutane, zinc borate. Preferred are antimony (Sb) and/or zinc (Zn) based materials, especially preferred are antimony trioxide and/or zinc stannate.

The polymeric mixture may comprise at least one further chemical blowing agent (e.g. releasing carbon dioxide, nitrogen or oxygen) chosen from the classes of organic blowing agents and/or inorganic blowing agents.

The polymeric mixture furthermore may comprise a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivatives), complex silicates (e.g. perlite, vermiculite), and combinations thereof.

The polymeric mixture may further comprise ingredients like biocides, stabilizers (e.g. versus UV, ozone, reversion etc.), colours etc., of any kind in any ratio, including additives for improving its manufacturing, application and performance, such as inhibitors, retarders, accelerators, etc. The present polymeric mixture may additionally comprise additives for char-forming and/or intumescent additives, like expanding graphite, for general protection purposes and/or to close and protect e.g. wall and bulkhead penetrations. Moreover, the present polymeric mixture may comprise substances that lead to a self-ceramifying effect in case of fire, like silicon containing compounds and/or internal adhesion promoters to ensure self-adhesive properties in co-extrusion and co-lamination applications, such as silicate esters, functional silanes, polyols, etc.

All of the aforementioned ingredients show easy mixing and good dispersion in a wide range of dosage.

The polymeric mixture can be mixed by standard methods widespread in the rubber industry, e.g. in an internal (Banbury®) mixer, single- or twin-screw extruder or on a mill, preferred are internal mixers. The shaping can be carried out in extruders, presses, calanders, etc. Preferred are extruders due to the possibilities to vulcanize and expand the material continuously within a hot air oven, microwave oven, salt bath, etc. Preferred are hot air and microwave ovens, because—among other things—no additional cleaning steps are necessary.

A major advantage of the claimed material is the feasibility to achieve low density FEFs with excellent technical properties without the use of ADCA, whereas the sole use of OBSH or endothermic chemical blowing agents or even the wrong proportion of such blowing agents has several, aforementioned disadvantages. Furthermore, such densities can also not be achieved with an increased amount of ADCA, at least not with comparable technical properties.

It is a further advantage that such a material is manufactured (expanded and vulcanized) at lower processing temperatures due to the lower decomposition temperatures of OBSH and endothermic blowing agents, thus the risk of reversion is significantly reduced. The high processing temperatures required for ADCA can lead to an overheat inside the foam, whereby discoloration and degradations may easily occur.

It is a prominent advantage of the claimed material that the used compounds are of low viscosity and can therefore be easily processed (less shear, scorch, etc.), nevertheless resulting in low densities and mechanical stable foams equal or better than ADCA foamed materials. If low viscosity materials are manufactured using ADCA, the mechanical performance is worse and the densities are higher. Lower densities are preferred as the heat build-up during extrusion is reduced, therefore the speed of extrusion can be increased so that the processing times can be reduced.

A surprising advantage of the claimed material is the lower amount of accelerators required for crosslinking the material in comparison to using ADCA, furthermore the processing temperatures are lower and the processing times are equal or even shorter.

A further advantage of the claimed material is the excellent stiffness and simultaneous flexibility, cuttability and bondability leading to a fast and easy applicability during installation.

Another advantage of the claimed material is the high degree of closed cells, determined by a vacuum water absorption of <5.0%, preferably <2.5% according to ASTM D 1056.

It is a further advantage that the claimed material provides high water vapor transmission (WVT) values of ≥3.000, preferably ≥5.000 according to EN 13469/EN 12086 (depending also on other raw materials within the mixture). The use of the blowing agent mixture does not have a negative impact on the WVT value in comparison to the used ADCA. Therefore, the material can be used for low temperature insulation (<0° C.), because the object to be insulated is well protected from under insulation corrosion (UIC) through condensation of humidity.

Another advantage of the claimed material is its versatility regarding the production equipment. It can be produced economically a continuous process, e.g. by extrusion or co-extrusion. The material can also be laminated, moulded, co-moulded, overmoulded, welded etc. directly as mono- or multilayer system and thus it can be applied in unrestricted shaping onto various surfaces in automotive, transport, aeronautics, building and construction, marine and offshore, furniture, machinery engineering and many other industries, even by thermoforming or other shaping methods. The claimed material can particularly be manufactured in the form of tubes and sheets in a continuous process in various wall thicknesses and inner diameters; most suitable are wall thicknesses between 3 and 50 mm.

EXAMPLES

In the following examples and comparative examples a four step manufacturing process is used: first of all mixing of the components of the polymeric mixture (without blowing agents and crosslinking system), afterwards addition of the crosslinking system and blowing agent mixture in a second mixing step, subsequently extrusion (shaping) and finally expansion and crosslinking. Instead of two mixing steps, the material can also be cooled down in the mixer or on a mill and the crosslinking system and blowing agent mixture can be added within the first mixing step.

Extrusion was performed on a strip feed single screw vacuum extruder providing unexpanded sheets and tubes. Those were crosslinked and expanded simultaneously in a hot air oven cascade of five ovens to sheets of 25 mm wall thickness and tubes of 25 mm wall thickness and 22 mm inner diameter. Table 1 lists the raw materials used for the polymeric mixture. Table 2 gives an overview about the make-up of some exemplary polymeric mixtures and Table 3 comprises some technical properties of the foamed and crosslinked material.

TABLE 1

Raw materials

| Chemical Name | Trade Name | Supplier |
|---|---|---|
| Acrylonitrile butadiene rubber (NBR) | Europrene ® N 2860 | Polimeri Europe, Italy |
| Ethylene propylene diene rubber (EPDM) | KEP650 | Kumho Polychem, Korea |
| Ethylene vinyl acetate (EVA) | Levapren ® 400 | Arlanxeo, Germany |
| Chlorinated Polyethylene (CPE) | Elaslen ® 401AY | Showa Denko, Japan |
| Diphenyl cresyl phosphate (DPK) | Disflamoll ® DPK | Lanxess, Germany |
| Paraffin oil (PO) | Sunpar ® 2280 | Sunoco Europe, Denmark |
| Carbon black (CB) | Corax ® N550 | Evonik Industries, Germany |
| Aluminium hydroxide (ATH) | AluMill ® F280 | Europe Minerals, Netherlands |
| Huntite/hydromagnesite mixture (HH) | Securoc ® C10 | Ankerport, Netherlands |
| Antimony trioxide (ATX) | Triox ® | Produits Chimiques de Lucette, France |
| Azodicarbonamide (ADC) | Unicell ® D 300 K | Tramaco, Germany |
| Decabromodiphenyl ether (Deca-BDE) | Saytex ® 102 E | Albemarle, France |
| 4,4'-Oxybis (benzenesulfonylhydrazide) (OBSH) | Tracel ® OBSH 160 NER | Tramaco, Germany |
| Sodium bicarbonate (SB) | Bicar ® | Solvay ®, France |

TABLE 2

Make-up of exemplary polymeric mixtures

| | 1* | 2* | 3* | 4* | 5 | 6 | 7 |
|---|---|---|---|---|---|---|---|
| Acrylonitrile butadiene rubber (NBR) | 85.0 | 85.0 | 85.0 | — | 85.0 | 85.0 | — |
| Ethylene propylene diene rubber (EPDM) | — | — | — | 80.0 | — | — | 80.0 |
| Ethylene vinyl acetate (EVA) | 15.0 | 15.0 | 15.0 | — | 15.0 | 15.0 | — |
| Chlorinated Polyethylene (CPE) | — | — | — | 20.0 | — | — | 20.0 |
| Diphenyl cresyl phosphate (DPK) | 75.0 | 75.0 | 75.0 | — | 75.0 | 75.0 | — |
| Paraffin oil (PO) | — | — | — | 45.0 | — | — | 45.0 |
| Carbon black (CB) | 10.0 | 10.0 | 10.0 | 15.0 | 10.0 | 10.0 | 15.0 |
| Aluminium hydroxide (ATH) | 200.0 | 200.0 | 200.0 | 150.0 | 200.0 | 200.0 | 150.0 |
| Huntite/hydromagnesite mixture (HH) | 50.0 | 50.0 | 50.0 | 50.0 | 50.0 | 50.0 | 50.0 |
| Antimony trioxide (ATX) | — | — | — | 10.0 | — | — | 10.0 |
| Azodicarbonamide (ADC) | 60.0 | — | — | 55.0 | — | — | — |
| Decabromodiphenyl ether (Deca-BDE) | — | — | — | 70.0 | — | — | 70.0 |
| 4,4'-Oxybis (benzenesulfonylhydrazide) (OBSH) | — | 130.0 | 80.0 | — | 110.0 | 95.0 | 90.0 |

TABLE 2-continued

Make-up of exemplary polymeric mixtures

| | 1* | 2* | 3* | 4* | 5 | 6 | 7 |
|---|---|---|---|---|---|---|---|
| Sodium bicarbonate (SB) | — | — | 50.0 | — | 20.0 | 35.0 | 30.0 |
| Additives, crosslinking agents, etc. (AD) | 30.0 | 30.0 | 30.0 | 25.0 | 25.0 | 25.0 | 20.0 |
| Σ | 525.0 | 595.0 | 595.0 | 520.0 | 590.0 | 590.0 | 580.0 |

*comparative examples

Table 3 presents the density (according to DIN EN ISO 845), thermal conductivity at 0° C. (according to DIN EN ISO 8497/DIN EN 12667), water vapour absorption (according to ASTM D 1056) and water vapour transmission (WVT, according to EN 13469/EN 12086) of comparative examples 1 to 4 and innovative examples 5 to 7.

It clearly shows that the right balance between OBSH and endothermic blowing agent (e.g. sodium bicarbonate) can significantly improve the technical properties of the resulting foam, while the sole use of OBSH or a higher share of endothermic blowing agent has the opposite effect, especially regarding WVT.

Beside the listed technical properties, an increase in compression deflection (according to ASTM D 1056) for the innovative examples 5 to 7 could be observed, too, although such samples have the lowest densities.

TABLE 3

Technical properties

| Material | Density [kg/m$^3$] | Thermal conductivity [W/(m*K)] @ 0° C. | Water vapor absorption [%] | WVT |
|---|---|---|---|---|
| 1* | 62 | 0.0385 | 2.8 | 3200 |
| 2* | 60 | 0.0392 | 7.0 | 800 |
| 3* | 68 | 0.0412 | 6.2 | 400 |
| 4* | 60 | 0.0390 | 2.2 | 4600 |
| 5 | 49 | 0.0349 | 1.7 | 6200 |
| 6 | 53 | 0.0362 | 2.2 | 5400 |
| 7 | 53 | 0.0355 | 1.3 | 7300 |

The invention claimed is:

1. A material having a closed cell structure prepared from a polymeric mixture, comprising:
   a) ≤40.0 wt % to ≥10.0 wt % of at least one elastomer or a blend of an elastomer and a thermoplastic polymer, of which at least 25 wt % is at least one sulphur and/or metal oxide crosslinkable polymer and
   b) 5 to 40 wt % of a blowing agent mixture comprising 70 to 95 wt % of 4,4'-oxybis(benzenesulfonyl hydrazide) and 5 to 30 wt % of at least one endothermic blowing agent, where the amounts of 4,4'-oxybis(benzenesulfonyl hydrazide) and the at least one endothermic blowing agent sum up to 100 wt. %,
wherein the material having a closed cell structure has a vacuum water absorption of <5.0% according to ASTM D 1056.

2. The material according to claim 1, wherein the at least one elastomer or the blend of an elastomer and a thermoplastic polymer comprises at least 80 phr of acrylonitrile butadiene rubber, polychloroprene, ethylene propylene diene rubber, butyl rubber including chlorinated and brominated butyl rubber, butadiene rubber, styrene butadiene rubber, polyvinyl chloride including its co- and terpolymers, polyethylene including its co- and terpolymers, chlorinated polyethylene, or a combination thereof.

3. The material according to claim 1, wherein the at least one endothermic blowing agent of the blowing agent mixture is a carbonate or hydrogen carbonate.

4. The material according to claim 1, wherein both the 4,4'-oxybis(benzenesulfonyl hydrazide) and the at least one endothermic blowing agent have a median particle size of 1 to 20 μm according to ISO 13320:2009.

5. The material according to claim 1, wherein the 4,4'-oxybis(benzenesulfonyl hydrazide) and the at least one endothermic blowing agent are coated or surface-modified.

6. The material according to claim 5, wherein the 4,4'-oxybis(benzenesulfonyl hydrazide) and the at least one endothermic blowing agent are coated with fatty acids and/or metal salts of fatty acids and/or surface-modified by silanization.

7. The material according to claim 1, wherein the polymeric mixture further comprises at least 60 phr of at least one inorganic filler.

8. The material according to claim 7, wherein the at least one inorganic filler comprises a metal.

9. The material according to claim 1, wherein the polymeric mixture further comprises at least 15 phr of at least one plasticizer.

10. The material according to claim 1, wherein the polymeric mixture further comprises at least one flame retardant.

11. A material according to claim 1, having a density of ≤70 kg/m$^3$ according to DIN EN ISO 845.

12. The material according to claim 11, having a vacuum water absorption of <2.5% according to ASTM D 1056.

13. The material according to claim 11, having a water vapor transmission (WVT) value of ≥3.000 according to EN 13469 or EN 12086.

14. A thermal and/or acoustical insulation material comprising the material according to claim 11.

15. A process for manufacturing a closed cell crosslinked and expanded flexible material having a density of ≤70 kg/m$^3$, according to DIN EN ISO 845, comprising:
   1) providing a polymeric component which is at least one elastomer or a blend of an elastomer and a thermoplastic polymer, wherein at least 25 wt % of the polymeric component is at least one sulphur and/or metal oxide crosslinkable polymer and the polymeric component is free of any blowing agent mixture and any crosslinking system;
   2) then adding a crosslinking system and a blowing agent mixture comprising 70 to 95 wt % of 4,4'-oxybis(benzenesulfonyl hydrazide) and 5 to 30 wt % of at least one endothermic blowing agent, wherein the 4,4'-oxybis(benzenesulfonyl hydrazide) and the at least one endothermic blowing agent sum up to 100 wt. %, to the mixture of polymeric components in a mixing step to obtain a second mixture, wherein the second mixture comprises 40.0 wt % to 10.0 wt % of the polymeric component and 5 to 40 wt % of the blowing agent mixture; and
   3) subsequently extruding and finally expanding and crosslinking the second mixture to obtain a crosslinked and expanded flexible material having a closed cell structure that has a vacuum water absorption of <5.0% according to ASTM D 1056.

16. The process of claim 15, wherein the crosslinking system comprises a peroxide, a triallylcyanurate, a triallylisocyanurate, a phenylmaleimide, a thiadiazole, a fatty acid amide, a hydrosilylation agent, a radiation activator, a sulphur system, a bisphenolic compound a metal oxide, or a combination thereof.

17. The process of claim 15, wherein the crosslinked and expanded flexible material having a closed cell structure has a water vapor transmission (WVT) value of ≥3.000 according to EN 13469 or EN 12086.

18. The material of claim 7, wherein the at least one inorganic filler is an inorganic filler that releases water and/or carbon dioxide and/or carbon monoxide at temperatures above 180° C.

19. The material of claim 7, wherein the at least one inorganic filler is aluminium hydroxide, magnesium hydroxide, huntite, hydromagnesite, or a combination thereof.

20. The material of claim 1, wherein the polymeric mixture further comprises an organohalogen compound, an (organo)phosphorous compound, or a combination thereof.

* * * * *